July 30, 1929.  J. GOOD  1,722,288
METHOD AND APPARATUS FOR OPERATING INTERNAL COMBUSTION ENGINES
Original Filed Nov. 7, 1919
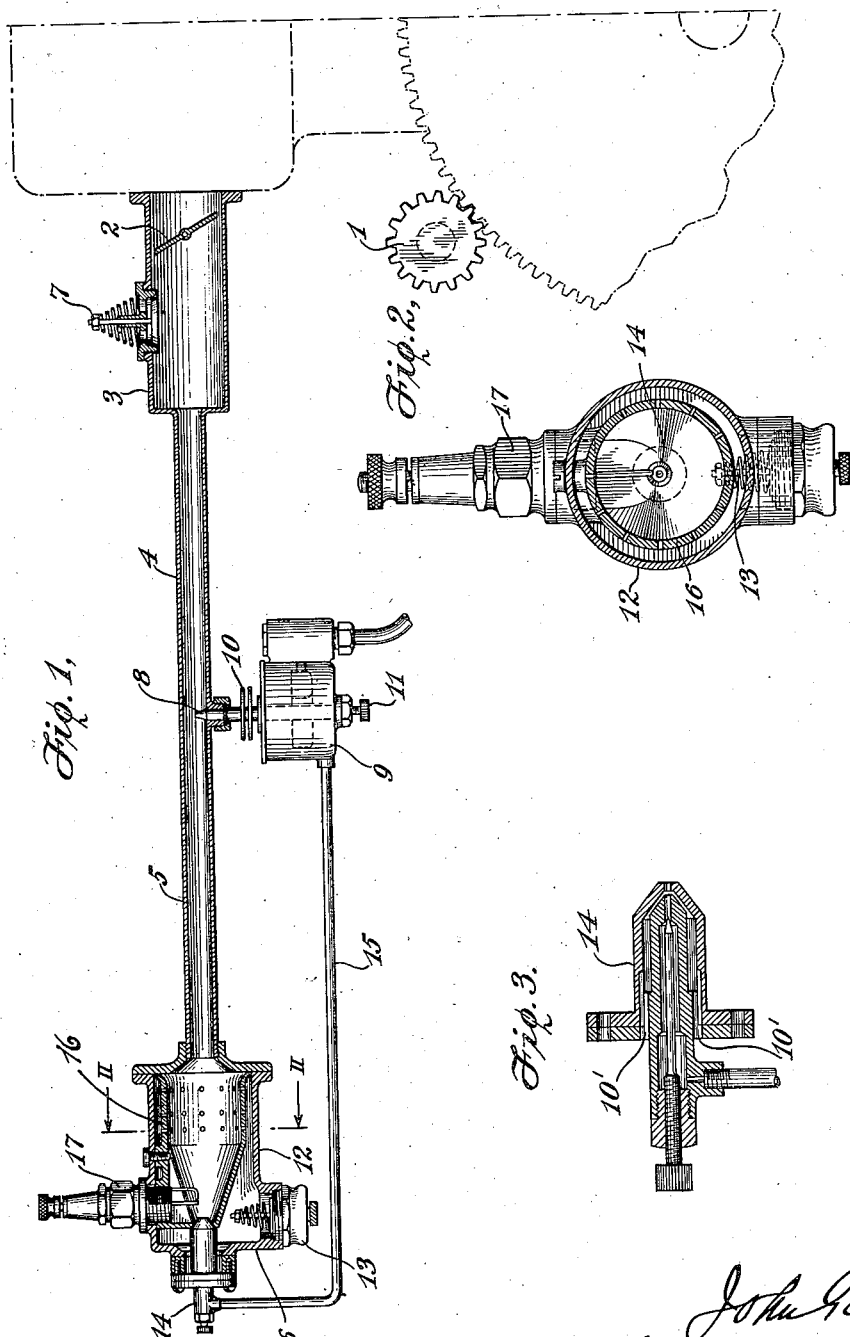

Patented July 30, 1929.

1,722,288

UNITED STATES PATENT OFFICE.

JOHN GOOD, OF GARDEN CITY, LONG ISLAND, NEW YORK, ASSIGNOR TO GOOD INVENTIONS CO., OF NEW YORK, N. Y., A CORPORATION OF NEW YORK.

METHOD AND APPARATUS FOR OPERATING INTERNAL-COMBUSTION ENGINES.

Application filed November 7, 1919, Serial No. 336,277. Renewed September 25, 1928.

The object of this invention is to provide for the prompt starting and efficient operation of internal combustion engines on low grade gasoline, kerosene and similar liquid fuels, especially in cold weather.

In the drawing Figure 1 illustrates in longitudinal section a preferred form of apparatus embodying the invention, shown in simplified form.

Fig. 2 is an enlarged scale section of the suction burner on line 11—11 of Figure 1. Fig. 3 is a section of the spray nozzle.

The invention consists in causing the suction effect of the rotating engine to create a mixture of fuel and air which is ignited in any appropriate way, to give a flame which is drawn into the intake passage and toward the engine. Into this flame and prior to its dilution with air or any other cooling medium, liquid fuel is introduced, also without air and in such manner as to be vaporized in and by the flame as well as by contact with the hot walls of the passage, thereby producing a mixture of hot flame or flame-products and vaporized fuel. Immediately following the vaporization of the fuel in this manner the air requisite to make this mixture of explosive proportions is admitted to it and the resulting medium, cooled by admixture with such air, then flows directly into the combustion space of the engine where it is readily ignitable by the engine spark even though the engine be quite cold. The suction-induced flame may be produced by various forms of apparatus and preferably by electric spark ignition as later explained. The proportions of fuel and air of which it is constituted are preferably those of an explosive mixture, but explosion thereof on ignition is avoided by avoiding homogeneous mixture within the burner at the point of ignition. The flame produced in this or in any other suitable way is allowed to extend freely in the intake passage and the liquid fuel is introduced therein preferably at a point near the end or tip of the flame, that is to say at a point where the flame has had opportunity to develop a considerable amount of heat. The fuel liquid flows into the flame by virtue of the suction effect in the intake which also gives a certain spraying action. The vaporization of the liquid so admitted is allowed to proceed for an appropriate time interval, suited to the character of the fuel, before the air is added and such interval is provided by making the length of this part of the intake passage as long as may be appropriate.

The engine shown in Figure 1 may be assumed to be an ordinary internal combustion engine such as used in automobiles. It is provided with starting means for cranking it represented in a general way by the pinion 1 which may also be assumed to be the equivalent of a hand crank. The intake ports of the engine are connected, under control of throttle 2, to the intake passage which for convenience of reference may be assumed to be composed of sections designated 3, 4, 5, and 6. The section 3 is provided with an air intake valve (7) opening inwards against the tension of a spring.

Between sections 4 and 5 is located the nozzle 8 through which the liquid fuel is delivered to the flame. This nozzle communicates with a liquid fuel receptacle 9, indicated as float-controlled and is provided with heat-radiating fins 10 to protect the receptacle against the heat in the intake passage. A needle valve 11 serves to regulate the fuel delivery.

The section 6 is a suction-operated burner, adapted to burn liquid fuel to produce the flame referred to. It consists, in the case illustrated, of an exterior casing 12 having an entrance for air from atmosphere controlled by a spring seated valve 13. An atomizing spray nozzle 14 (Fig. 3) is mounted in the end of the casing and receives liquid fuel through pipe 15 from the fuel receptacle 9. The nozzle 14 is provided with one or more small air ducts 10' for admitting air, in such manner as to draw fuel from the receptacle and produce an air atomized spray centrally within the casing and within a perforated interior air distributing shell 16 therein. An electric spark-plug, or equivalent lighting means 17, is located with its spark gap within the shell 16 in position to intercept the spray and ignite it, and air in-flowing from the valve 13 and through the surrounding holes in the shell serves to maintain the combustion. By locating the spark gap in the position indicated and admitting and distributing the combustion-supporting air in the manner stated, ignition of the spray is accomplished quietly and reliably. The rate of delivery of fuel and air to the burner is preferably adjusted according to the proportions of an explosive mixture as before stated but by igniting the spray at the point indicated before it has become homogeneously mixed with all the air, the combustion is continuous and steady so long as the suction effect is maintained within normal limits. The flame drawn into the flame section 5 of the intake passage extends freely therein and if no liquid fuel were admitted by the nozzle 8 would naturally extend beyond that nozzle 8 and into the section 4. The entrance of any considerable amount of fuel liquid from the nozzle, however, has the effect of cutting off the flame. The mixture of flame and fuel liquid resulting at this point continues on through section 4 and occupies sufficient time in transit therethrough to attain substantially complete vaporization by the time it is mingled with air inflowing from the valve 7 in section 3. The latter section is of larger capacity in order to accommodate the larger volume, and the air admitted to it is adjusted with reference to the needle valve 11 or vice versa, to make the resulting medium, explosive. The relative vacuum or suction effect maintained by the tension of the spring of valve 7 is sufficient when extended to the suction burner to create the ignitable mixture therein above referred to and the delivery of such mixture is controlled by adjustment of the valve 13 and the spray nozzle 14 so that an adequate flame is produced under all conditions for vaporizing the fuel.

When an engine equipped as above described is to be set in action, the spark plug 17 is energized as by connection to one of the engine's spark plugs, or to the distributor head of the ignition system thereof, or otherwise, so as to create one or more sparks within the burner, while the engine is being rotated by the starting agency to start the suction effect. This effect immediately creates an ignitable fuel mixture and establishes a flame as above described and also causes the delivery of fuel from the fuel nozzle into the flame. The resulting mixture, after an appropriate interval, meets with air from the valve 7 whence it enters the engine. As soon as the engine picks up on this medium, which it will do instantly it continues the suction effect by virtue of its own operation, and therefore, continues the production of the said medium in such amount as may be called for by the adjustment of the throttle 2.

It should be noted that the flame from the suction burner is maintained undiluted and without contact with outside air until it has reached or passed beyond the point of fuel introduction; also, that more or less heating effect may be secured, according to the requirements of the fuel used, by placing the said nozzle farther from or nearer to the source of flame. In the instance illustrated it is assumed that the nozzle is located between the middle and the tip of the flame, if the latter were allowed to assume its natural length, this being an average condition subject to variation by changing suction effect and other causes. With some fuels and types of engines it is quite satisfactory to locate the nozzle 8 beyond the tip of the flame so that the admixture of the fuel liquids is with very hot, but not incandescent gases, but the flame is in any event undiluted with any substantial amount of air or any free oxygen which might combine with the entering fuel. The length of the section 4 may be varied and the length of section 3 is not important. The presence of flame products, produced in this way, in the resultant engine operating medium serves the purpose of eliminating the so-called knock when certain fuels are used or when the compression pressure of the engine is relatively high. The burner is preferably set to operate on the proportion of an explosion mixture as above stated which burns without appreciable excess of air or fuel, but the engine will operate if it is set slightly lean or rich.

It will be obvious that the entire length of the intake pasage, suitable for accommodating the actions above described may be incorporated in structures of greater compactness by arranging the sections 3, 4, and 5 as a coil or otherwise, and that various other means may be resorted to for producing the results of the invention the principles of which have now been described. It will also be obvious that any suitable means may be used for controlling the extent of the flame with respect to the fuel delivery and the proportion of the added air, according to principles common in carburetor construction.

For example in starting the engine the air valves 7 may be kept from opening momentarily so as to increase the heating effect at the instant of starting and give an initially rich mixture to the engine, which is sometimes desirable. Moreover it should be observed that the apparatus herein shown may be used in various ways; for example, the combustion in the suction burner may be stopped after the engine has been started and warmed up and the unignited mixture produced by it may then serve as a supplement to the mixture produced by the nozzle 8 and valve 7, heat for vaporization if then necessary being obtained from the engine exhaust gas or jacket water in the well known way.

Claims—

1. The method of operating internal combustion engines which consists in causing the suction effect of the rotating engine to create a mixture of fuel and air, igniting said mixture outside of the engine to produce a flame without excess of air, conducting the hot products resulting from such ignition through a passage without dilution, causing said suction effect also to draw liquid fuel without air into said passage in contact with said products therein, allowing vaporization of the fuel liquid to take place in the resulting mixture, and then admitting air into said mixture in proportions to produce an explosive medium, and admitting such medium to the engine.

2. The process of operating internal combustion engines which consists in causing the suction effect of the rotating engine to create an ignitable spray of liquid fuel, and an inflowing current of air therefor in proportions equivalent to those of an explosive mixture, igniting said spray, before it has been homogeneously mixed with the air, and thereby producing a flame without excess of air, conducting the flame so produced through a passage, causing said suction effect also to distribute fuel liquid without air into said passage allowing it to be vaporized therein, then adding air to the vaporized mixture in the proportion to produce an explosive medium thereof and admitting such medium to the engine.

3. In an internal combustion engine the combination of an intake passage, means connected thereto for delivering flame without excess of air into said passage, means for delivering liquid fuel without air into the flame therein and means for admitting air to the intake.

4. The method of operating internal combustion engines which consists in causing the suction-effect of the rotating engine to create a spray of liquid fuel and air in proportions adapting it for ignition and igniting the same, coincidently causing the same suction effect to create another spray of liquid fuel into the hot products of said ignited spray for instant vaporization thereby and in the absence of air in such quantity as might increase the temperature, whereby the liquid of said last mentioned spray is vaporized without burning, adding air to the resulting mixture when partially cooled and admitting the same to the engine.

5. The method of starting internal combustion engines which consists in establishing a combustible spray mixture of liquid fuel and air in proportions having no substantial excess of fuel or air in the products electrically igniting said spray mixture and mixing the flaming products with a liquid fuel spray in the absence of further combustion-producing air, adding air to the resulting mixture and admitting the same to the engine.

6. The method of operating internal combustion engines which consists in causing the suction effect of the rotating engine to create a mixture of fuel and air, igniting such mixture outside of the engine, conducting the flame thereof through a passage, causing such suction effect to draw liquid fuel in subdivided form in the absence of air into contact with the flame in said passage, causing the suction effect also to draw air into the resulting mixture to produce an explosive medium and admitting the latter to the combustion space of the engine.

7. The method of operating internal combustion engines which consists in causing the suction effect of the rotating engine to create a mixture of fuel and air, igniting said mixture outside of the engine, allowing the flame thereof to extend through a suitable passage, causing said suction effect also to draw liquid fuel in the absence of air into said flame at a point near the free end thereof, causing said suction effect also to draw air into the resulting mixture to produce an explosive medium and admitting the latter to the combustion space of the engine.

In testimony whereof, I have signed this specification.

JOHN GOOD.